Nov. 4, 1924.

H. J. HILMES

DRIVING CONNECTION

Filed March 12, 1924

1,514,522

Inventor
Henry J. Hilmes

By

Attorney

Patented Nov. 4, 1924.

1,514,522

UNITED STATES PATENT OFFICE.

HENRY JOSEPH HILMES, OF ALTAMONT, ILLINOIS.

DRIVING CONNECTION.

Application filed March 12, 1924. Serial No. 698,716.

*To all whom it may concern:*

Be it known that I, HENRY J. HILMES, a citizen of the United States, and a resident of Altamont, in the county of Effingham and State of Illinois, have invented certain new and useful Improvements in Driving Connections, of which the following is a specification.

My present invention relates generally to driving connections and more particularly to driving connections between the propeller shaft and differential of automobiles, my object being the provision of a driving connection which will eliminate the common troubles at this point of automobile driving gear with respect to the stripping of the differential ring gear.

It is a well known fact that considerable difficulty has been encountered in the driving gear of automobiles and other motor cars in the particular place above specified which is subjected to great strain in use. In the ordinary construction the ring gear of the differential is beveled and engaged by a bevel gear at the rear of the propeller shaft, this arrangement obviously bringing about great strain upon the engaging teeth particularly when the bearings of both the propeller shaft and those of the differential within the differential housing have become slightly worn, permitting the ring gear to yield with respect to the beveled driving pinion of the propeller shaft. My invention seeks to avoid these objections by a simple arrangement which but slightly varies the ordinary construction without necessitating any rearrangement of the parts and which in use will avoid the great strain upon the thrust bearings which the ordinary construction proposes.

Figure 1:
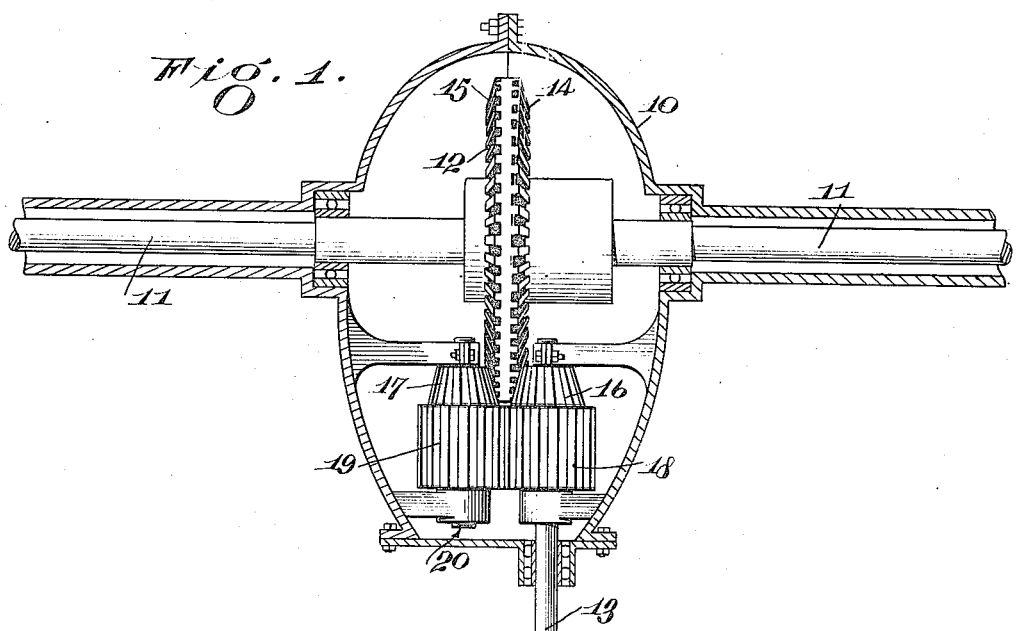
Figure 2:
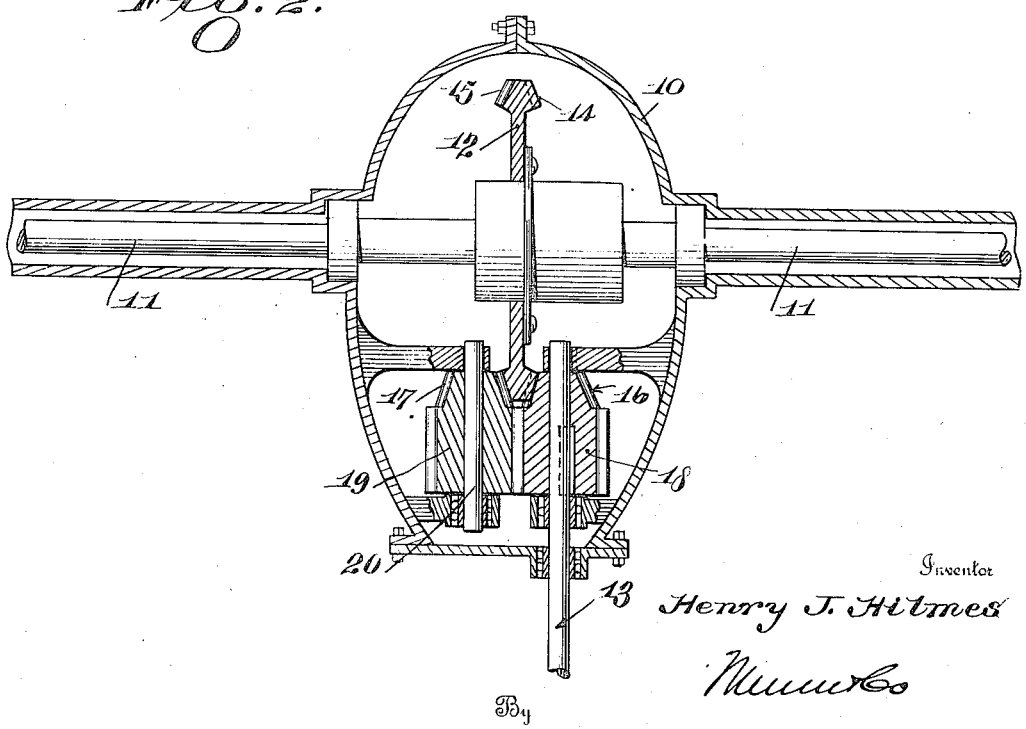

In the accompanying drawing which illustrates my present invention and forms a part of this specification, Figure 1 is a sectional view through a differential showing my improved connections in top plan, and Figure 2 is a similar view, my improved connections being shown in section.

Referring now to these figures I have indicated the differential generally at 10 and the rear shaft at 11, the differential ring gear being seen at 12 and the propeller shaft at 13. In the ordinary construction the rear end of the propeller shaft 13 has a bevel driving pinion engaging bevel teeth upon one side of the ring gear 12 and in my present construction this general arrangement is retained, the ring gear 12 having bevel teeth 14 and 15 at opposite sides thereof for engagement respectively by a beveled pinion 16 at the rear end of the propeller shaft 13 and a beveled pinion 17, the beveled pinions 16 and 17 being formed in connection with intermeshing spur gears 18 and 19.

The teeth 14 and 15 of the ring gear 12 are preferably staggered as shown and the driving pinions 16 and 17 which according to my invention thus engage opposite faces of the ring gear are of course disposed so as to properly cooperate with the staggered teeth 14 and 15 of the ring gear, these pinions 16 and 17 being preferably formed integral with the spur gears 18 and 19. Pinion 17 and spur gear 19 are disposed upon a short shaft 20 suitably mounted in bearings within the differential case parallel to the rear portion of the propeller shaft 13 which is disposed within the case and it is obvious from this arrangement that I avoid the imposition of the severe strains upon the thrust bearings of the differential which are incident to the ordinary construction and I eliminate the danger of stripping of the teeth of the ring gear inasmuch as the latter is confined between driving pinions and is in this way prevented from yielding with respect to either thereof.

My invention presents a simple solution of the problem and is well adapted to effectively and efficiently serve the intended functions without disturbing the usual relation of the parts and without adding materially to the cost thereof.

I claim:

A driving gear of the character described including a differential ring gear having teeth at its opposite sides, a propeller shaft, a driving pinion on said shaft engaging the teeth at one side of the ring gear, a second pinion engaging the teeth at the opposite side of the ring gear, intermeshing spur gears each formed integral with one of said pinions, a shaft on which the second pinion and its integral gear are mounted in parallel axial relation to the propeller shaft pinion and its gear, and bearings in which the said shafts are journaled beyond the ends of the pinions and gears and between which bearings the latter are confined, the said teeth at opposite sides of the ring gear being staggered with respect to one another and the said pinions being relatively arranged to coact with the staggered relation of the ring gear teeth as described.

HENRY JOSEPH HILMES.